March 11, 1941.  E. E. WEMP  2,234,459
FRICTION CLUTCH
Filed March 28, 1938  3 Sheets-Sheet 2

INVENTOR.
Ernest E. Wemp
BY Barnes, Kisselle, Laughlin & Reisch
ATTORNEYS

March 11, 1941.     E. E. WEMP     2,234,459
FRICTION CLUTCH
Filed March 28, 1938     3 Sheets-Sheet 3
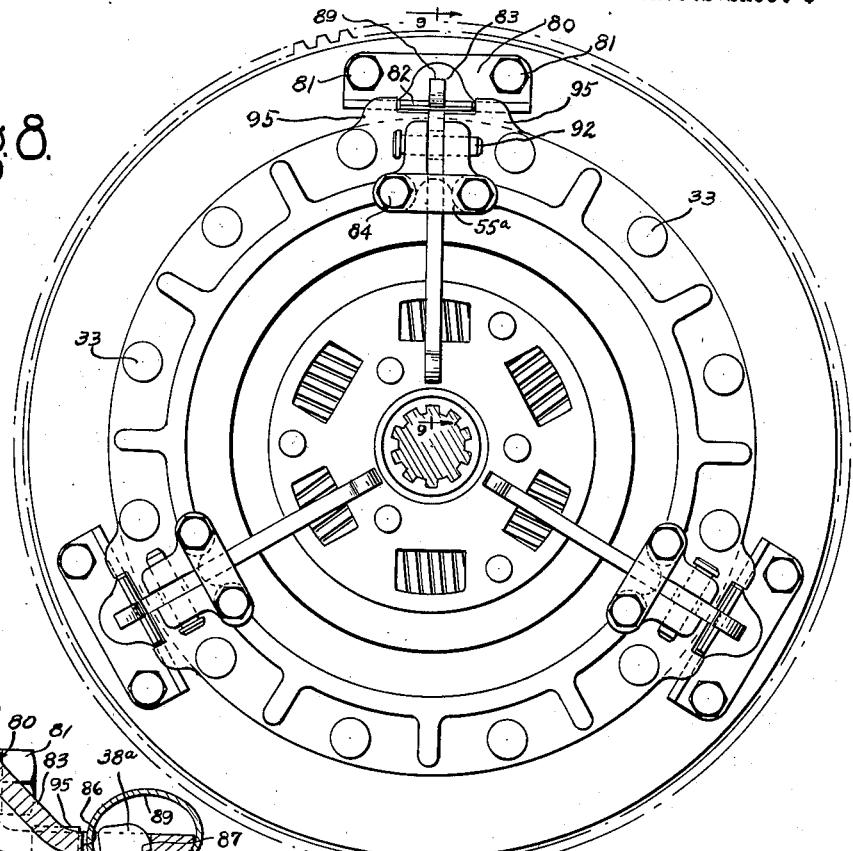
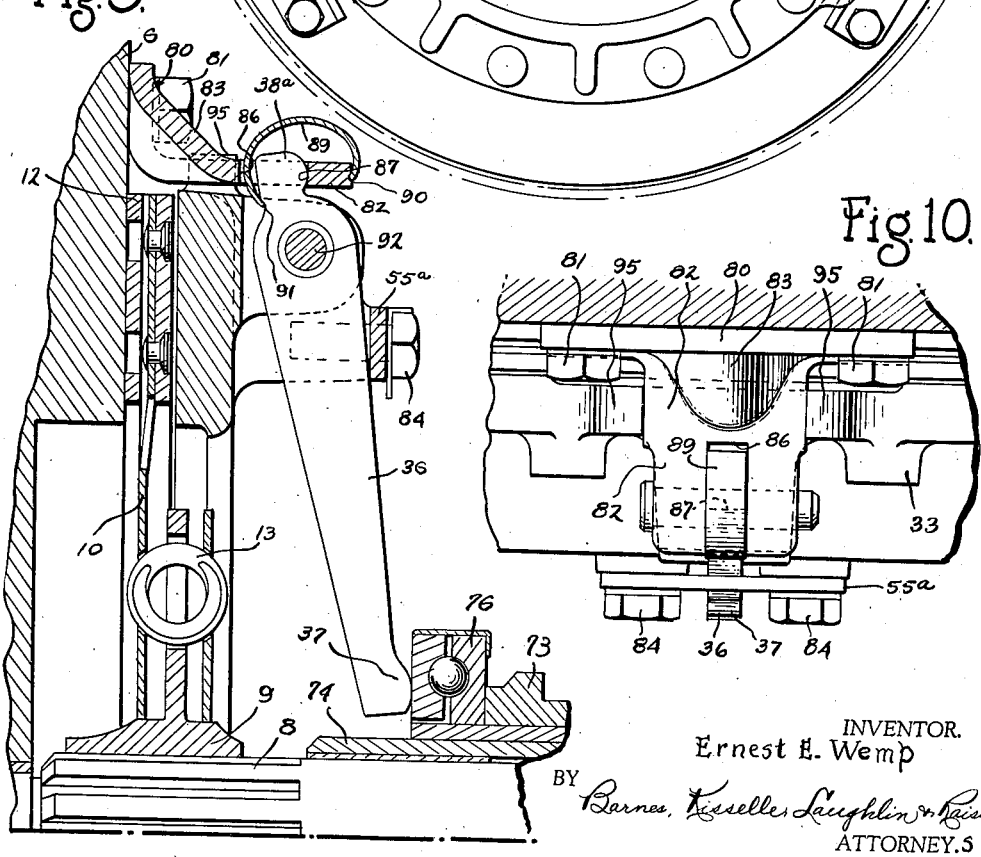
INVENTOR.
Ernest E. Wemp
BY Barnes, Kisselle, Laughlin & Raisch
ATTORNEYS Patented Mar. 11, 1941

2,234,459

UNITED STATES PATENT OFFICE 2,234,459

FRICTION CLUTCH

Ernest E. Wemp, Detroit, Mich.

Application March 28, 1938, Serial No. 198,389

10 Claims. (Cl. 192—68)

This invention has to do with a clutch, and it is concerned particularly with a clutch construction arranged to have forces applied thereto, for the clutch packing pressure, from a source of power disposed outside of and separately from the clutch construction.

It has been the practice to embody clutch packing springs in the clutch construction so that the springs act more or less directly upon one or more of the clutch members. Where a plurality of coil springs are used arranged in an annulus, a so-called clutch cover plate is employed, and the annulus of coil springs applies pressure at circumferentially spaced locations, which, however, are relatively close to each other.

There are a number of features in a clutch constructed in accordance with this invention, and among these are the following: The clutch does not require a cover plate, and, therefore, the driving and driven members are more or less exposed to the ambient atmosphere so that heat generated by friction is readily dissipated. The clutch preferably includes control levers, and the pressure for packing the clutch into engagement is delivered through the levers. To facilitate employment of a few levers which deliver forces to a clutch member, such as a pressure plate, at relatively wide spaced points, a particular construction of the pressure plate is provided. The pressure plate is an axially shiftable member for clutch control, and it may be mounted by means of flexible metal carrier and driving members, in which connection a particular arrangement is embodied, or the pressure plate may have a sliding driving fit with another driving member.

In the accompanying drawings two different forms of clutches are shown for carrying out the invention, and these are specifically described below. In the accompanying drawings—

Fig. 3 is an enlarged cross sectional view taken on line 3—3 of Fig. 2 showing the clutch engaged.

Fig. 4 is a view similar to Fig. 3 illustrating the clutch in disengaged position.

Fig. 8 is a rear elevational view of a modified form of clutch.

Fig. 9 is an enlarged sectional view taken substantially on line 9—9 of Fig. 8.

Fig. 10 is a partial elevational view of the clutch structure shown in Figs. 8 and 9.

Figure 1:
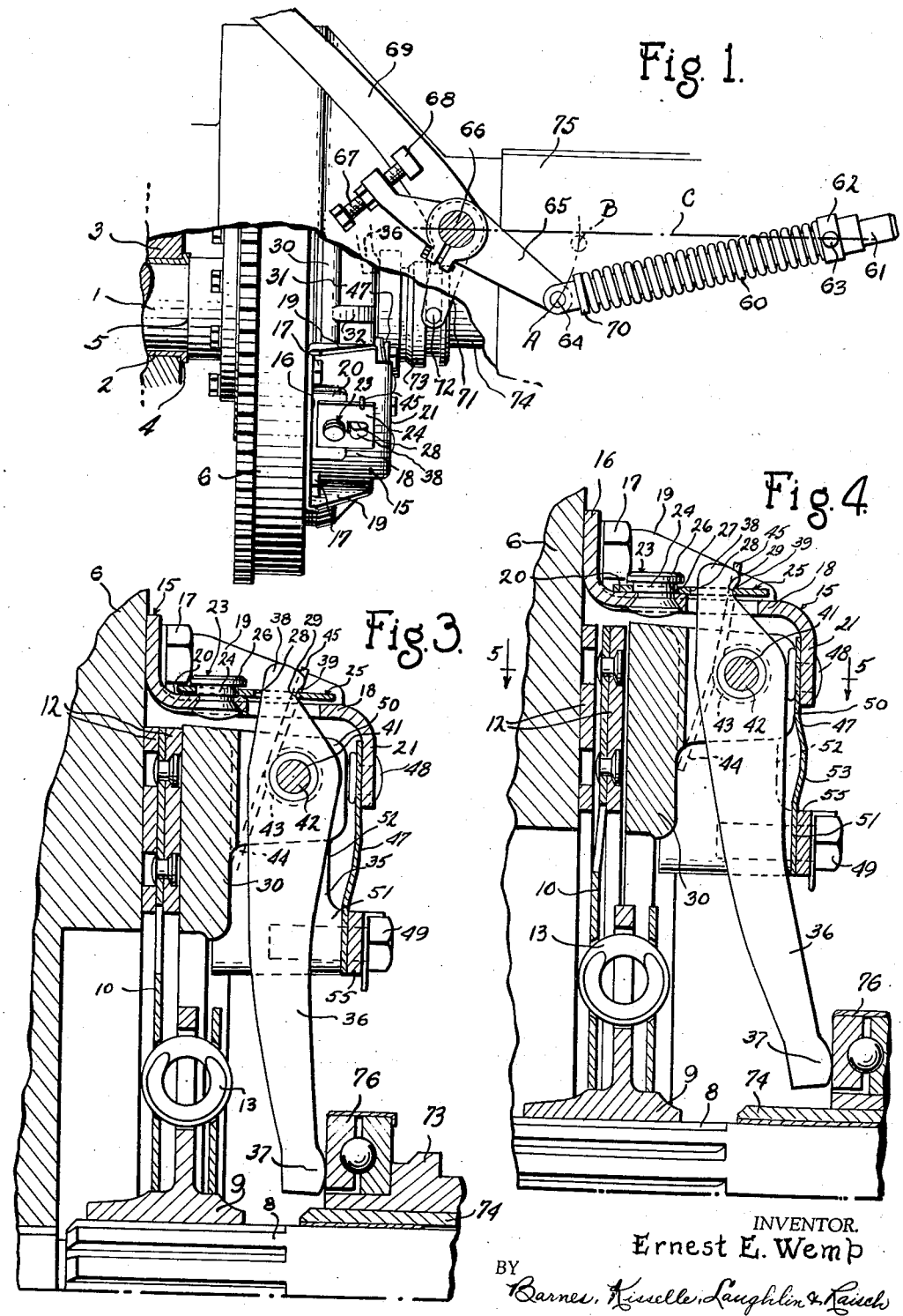
Fig. 1 is a general view illustrating an engine crank-shaft, flywheel, clutch and clutch control mechanism.

In Fig. 1 the crank-shaft of an engine, such as an internal combustion engine, is illustrated at 1 having a main bearing 2 mounted in a part 3 of the engine. The main bearing is arranged to take an end thrust and it may have a flange 4 for taking a thrust delivered by the shoulder 5 on the crank-shaft. The engine flywheel is illustrated at 6 and the flywheel constitutes one driving member of the clutch. A driven shaft is illustrated at 8 upon which the hub 9 of a clutch driven member 10 is splined, the driven member having suitable friction facings 12. The driven member may be so arranged as to resiliently space the facings apart when the clutch is disengaged as shown in Fig. 4, but which is arranged to collapse or substantially collapse in full clutch engagement as illustrated in Fig. 3. The driven member may also embody a vibration dampening construction 13. The structure for providing the resilient mounting for the facing and the structure for the vibration dampening arrangement may vary and forms no essential part of this invention, and, therefore, need not be further described.

Figure 2:
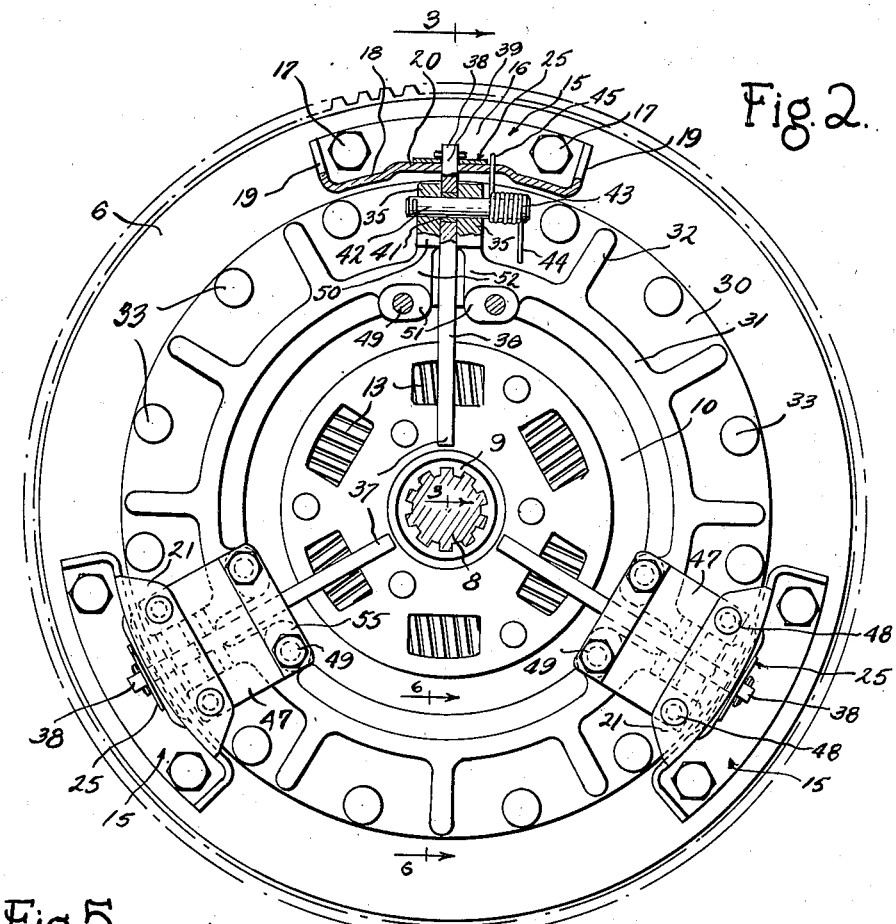
Fig. 2 is a view showing the clutch partly in rear elevation and with some parts cut away and some parts in section.

As above mentioned, the clutch of this invention may not employ a clutch cover plate. A plurality of brackets are used which, however, are identical in construction, and these brackets are generally illustrated at 15. These may be fashioned from sheet metal having a flange 16 arranged to abut against and to be secured to the flywheel by cap screws 17. Each bracket has an axially extending body portion 18 and for strength purposes has side flanges or fillets 19. The body portion 18 is preferably provided with a central flat portion 20. The edge of the body portion remote from the flange 16 is fashioned inwardly towards the axis to provide a flange 21. As illustrated in Fig. 2, three of such brackets are used where three clutch levers are used.

These brackets serve as supports for the fulcrums of the levers and serve to impart the drive to the clutch pressure plate. A fulcrum construction takes the form of a headed stud or rivet 23 tightly riveted to the bracket and having a neck portion 24 upon which is mounted a fulcrum plate 25. Each fulcrum plate has an aperture 26 for fitting on to the neck 24 and this fit is relatively loose so that the fulcrum plate may rock around the axis of the stud and so that it may shift or rock in a radial direction, as will be appreciated by a comparison of Figs. 3 and 4. To this latter end, the walls defining the aperture 26 are preferably fashioned on a radius as illustrated at 27. Each fulcrum plate has an aperture 28 for the reception of a lever, and the wall defining this aperture which takes the load of the lever is preferably fashioned on a radius as shown at 29.

A pressure plate is illustrated at 30, and this pressure plate is preferably reenforced by a bead or rib 31 running circumferentially, and angular fillets or buttresses 32. The purpose of this construction will presently appear.

The pressure plate is constructed to receive the clutch levers and this construction takes the form of enlarged or thickened portions 35, which preferably have a considerable radial extent as shown in Figs. 3 and 4. Each thickened portion 35 has a radially extending slot which may be formed by a milling operation for the reception of a lever. Such a lever is illustrated at 36 with its inner end in proximity to the axis and fashioned as at 37 for the reception of a thrust bearing and with its outer end 38 extending through the aperture 28 in the adjacent fulcrum plate. The outer end may be notched so as to fulcrum on the surface 29. The lever may be shaped so that there is a surface to surface contact between 29 and the notch-like formation 39 in the lever. The lever is pivotally mounted to the pressure plate as illustrated at 41, and this may be a needle roller bearing for antifriction purposes with a fulcrum pin 42 which preferably is elongated so as to project to one side of the enlargement 35 as illustrated in Fig. 2. A torsion spring 43 surrounds the projecting part of the pin and it has one arm 44 taking against the pressure plate and another arm 45 extending through an aperture in the bracket 15. This torsion spring is so stressed that (considering Fig. 3) the pin 41 is urged to the right as illustrated in Fig. 4. There is a spring for each lever and these springs tend normally to retract the pressure plate and disengage the clutch. The pressure plate may have a series of lugs 33 which may be drilled into for balancing purposes.

Figures 5, 6, 7:
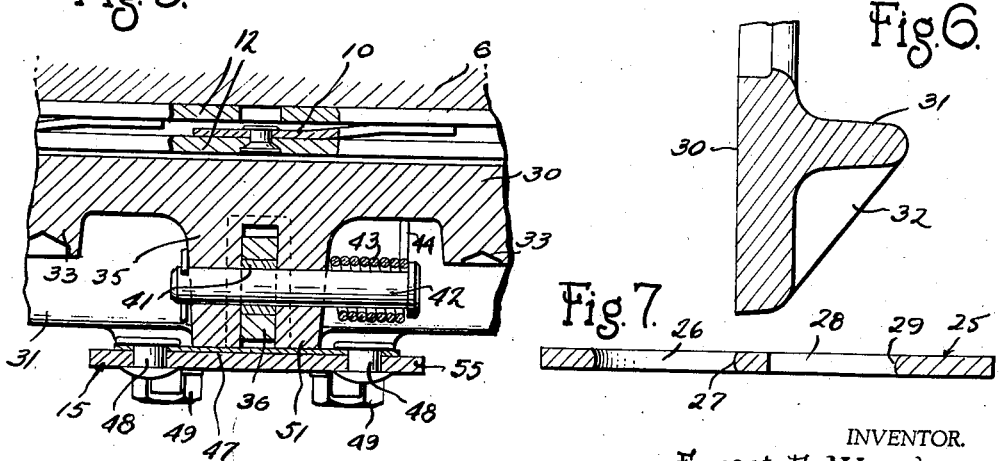
Fig. 5 is a view taken substantially on line 5—5 of Fig. 4.
Fig. 6 is a sectional view taken substantially on line 6—6 of Fig. 2 illustrating the pressure plate.
Fig. 7 is an enlarged view illustrating the details of a fulcrum plate.

In the form shown in Figs. 3 to 5, inclusive, the pressure plate is driven by flexible sheet metal drive members of a segmental nature. These members are shown as being generally rectangular in shape and are illustrated at 47. Each plate is secured as by means of rivets 48 to the flange 21 of a bracket, and the plate extends inwardly where it is secured adjacent its opposite edge to the abutment 35 as by means of cap screws 49. It will therefore be noted that the levers and the segmental driving plates are positioned one over the other in axial relationship. The enlargements 35 have radially outward portions 50 arranged to abut against the flanges 21 of the brackets or directly against the flexible driving plate 47, which in turn abuts against the flange 21 (Fig. 5) and this limits the retracting movement of the pressure plate. In fashioning the pressure plate it is convenient to surface the portions 50 and the portions 51 so that they lie in the same plane, the enlargements being relieved in the intermediate portion, as shown at 52, in order to provide a clearance relative to the flexible driving plates.

Therefore, when the clutch is disengaged, as shown in Fig. 4, the inner and outer portions of the flexible driving plates lie in a common plane of rotation. Accordingly, as the pressure plate shifts to the left for clutch engagement, the center to center distance between the rivets 48 and cap screws 49 increases. To take care of this action, the driving plates may be slightly bowed or corrugated as illustrated at 53 so that they straighten out somewhat in clutch engaged position, as shown in Fig. 3. If the plane of the portions 51 move from one side to the other of the plane of the surface against which the portions 50 abut in clutch disengaged position, the total differential would be lessened, and perhaps flexing of the brackets 15 would be adequate. However, with the surfaces 50 and 51 in a common plane the components are not divided. Therefore, it is preferred to bow the flexible driving members.

It will be observed that the weakest portions of the pressure plate are at those locations where the enlargements 35 are provided with the groove. To reenforce the pressure plate at this point a reenforcing member 55, which functions as a compression member, is also secured to the pressure plate by the cap screws 49.

The clutch shown illustrates three levers, and the packing pressure is applied through the levers. One means of doing this is illustrated in Fig. 1 where there is a coil spring 60 mounted on a rod 61 slidably guided in a reaction member 62 which is pivoted as at 63, the other end of the rod having a pivotal connection 64 with one arm of a rocker member 65 keyed or otherwise fixed to a rock-shaft 66. The other arm of the member 65 may have an adjustable screw 67 arranged to receive an abutment 68 of a clutch lever or pedal 69. The rod 61 has an abutment 70 against which this spring acts. On the rock-shaft 66 is a yoke 71 with pintles or pins 72 situated in a groove of an axially shiftable member 73 which may be slidably mounted on an extension 74 of the housing 75 for the transmission gears. The member 73 carries a thrust bearing preferably of the antifriction type, as illustrated at 76, for contact with the inner ends of the levers.

Before proceeding with the modified form, the operation of the clutch thus described and the function of the various parts will be considered. The clutch is shown in its engaged position in Fig. 3. At this time the spring 60 is tending to expand and it acts through the member 65, the rock-shaft 66 and yoke 71 to shift the member 73 and the thrust bearing 76 to the left, as Fig. 3 is viewed. The levers 36 are preferably of the second order and they are caused to fulcrum on the fulcrum surface 29, and the pressure plate is shifted to the left, with the result that the clutch is engaged with the driven disc packed between the pressure plate and the flywheel. At this time the spring exerts a turning moment on the member 65 which is relatively high, due to the fact that the connection 64 is in position A which is relatively remote from a center line C drawn through the centers of the rock-shaft 66 and the pivotal mounting 63. Thus, with the levers of the second order, which give a considerable mechanical advantage, the clutch is packed together with adequate pressure. All the while the clutch is engaged, the thrust is taken by the crank-shaft of the engine which is delivered into the body of the engine through the shoulder 5 and flange 4 of the bearing.

When it is desired to release the clutch, the operator rocks the lever 69 which may be accomplished by the foot of the operator in the usual manner, thus turning it counter-clockwise as Fig. 1 is viewed. When the pedal is depressed substantially to its maximum position, connection 64 assumes the position B. At this time the turning moment exerted by the spring is relatively low, because position B is relatively close to the center line C, and thus the clutch may be held disengaged with small physical effort. This, however, is covered in application Serial No. 198,388. The action of depressing the pedal 69 rocks the rock-shaft and withdraws the thrust bearing to the right, or in other words, substantially to the Fig. 4 position. The torsion springs 43 retract the pressure plate and cause clutch disengagement. This retracting movement is limited by the portions 50 abutting against the portion 21 of the bracket, or the driving plate secured thereto. As the levers rock the fulcrum plates 25 may rock radially, as illustrated by a comparison of Figs. 3 and 4, and any vibration or change of R. P. M. which tends to oscillate the pressure plate relatively to the flywheel, may cause rocking of the fulcrum plates on the axes of the studs 23. Thus the fulcrums are, so to speak, of a floating nature.

When the clutch is engaged the pressure is delivered to the pressure plate at three relatively widely spaced points where three levers are used. Thus it is desirable to have a pressure plate which will effectively resist tendency to flex or warp. Accordingly, the pressure plate is provided with the reenforcing rib 31 and buttresses 32. This reenforcement provides for the construction of a pressure plate not unduly heavy and yet of sufficient strength. Moreover, since the weakest part of the pressure plate is at the location of the slots for the reception of the levers, it is desirable to reenforce these points. The pressure tends to collapse the portions 51, and, therefore, the struts 55 are employed for taking this compression and thus reenforce the pressure plate.

In the clutch of this nature the pressure plate is substantially free of load when the clutch is disengaged. Therefore, any vibration in the engine or any relatively quick change in R. P. M. may tend to cause relative oscillation between the flywheel and the pressure plate. However, the flexible driving members 47 effectively resist this tendency and, to the contrary, hold the pressure plate quite firmly, and yet permit the pressure plate to shift axially while holding it centered.

The modified form embodies essentially the same construction, but in this form the pressure plate is driven by a slidable drive connection. In this form many of the parts correspond to the parts in the first described form, and bear the same reference characters. Thus duplicated description is unnecessary. In this form brackets 80 are secured to the flywheel by cap screws 81, and they are provided with an axially extending portion 82. The brackets may be provided with a central boss 83 for strength giving purposes. The pressure plate is of the same general construction, having thickened portions slotted for the reception of the levers, and a compression member 55a is employed, the same being secured by the cap screws 84. The same reference characters are applied to the levers, with this difference, that the outer ends of the levers 38a are located in apertures 86 in the brackets and fulcrumed thereon as at 87. A small leaf-like spring 89 for each lever has one end situated in a notch 90 in the bracket, with the other engaging the lever as illustrated at 91. These springs serve normally to retract the pressure plate and disengage the clutch. Each lever is pivotally mounted to the pressure plate as at 92.

The pressure plate is provided with lugs for a sliding and driving fit with the brackets. As shown, these lugs take the form of two spaced parts 95 for engaging opposite edges of the portion 82 of the brackets.

This clutch operates essentially the same as the previously described form in that it is normally held disengaged by the springs 89. The spring 60 causes clutch engagement by shifting the thrust bearing 76 (Fig. 9) to the left, thus rocking the levers on the fulcrums 87 and shifting the pressure plate to the left for clutch engagement. At this time the lugs 95 slidably shift along the edges of the brackets. When the clutch is disengaged the spring pressure is released and the pressure plate is retracted by the springs 89, with the lugs 95 shifting relatively to the brackets. Full released position of the clutch may be limited by contact of the levers with the struts 55a as illustrated in Fig. 9.

I claim:

1. A clutch comprising in combination, a rotary driving member, a driven member, a pressure plate, a plurality of substantially radially disposed levers pivotally connected to the pressure plate, a plurality of circumferentially spaced brackets attached to the driving member and having a connection with the pressure plate for driving the pressure plate and for affording axial shift of the pressure plate, a fulcrum member for the outer end of each lever mounted in a floating manner on each bracket for movement of the fulcrum member radially and circumferentially incident to lever operation, the inner ends of the levers being disposed in proximity to the axis of the clutch, an axially shiftable thrust member for engaging the inner ends of the lever, and means for applying clutch packing pressure to said thrust member.

2. In a clutch, a driving member, a driven member, an axially shiftable pressure plate non-rotatably secured to the driving member, a plurality of substantially radially disposed levers pivotally secured to the pressure plate, each lever having an outwardly projecting end, a fulcrum plate for each lever having an aperture through which the outer end of the lever extends, with one wall of the aperture serving as the fulcrum surface, means presenting a bearing on a radial axis upon which each fulcrum plate is journaled, the bearing surface having a radial extent greater than the radial dimension of the portion of the fulcrum plate on said bearing surface whereby the fulcrum plate may rock radially and circumferentially.

3. A clutch structure comprising in combination, a driving member, a driven member, a pressure plate, a plurality of circumferentially spaced sheet metal brackets secured to the driving member, said brackets having axially extending portions positioned outwardly of the periphery of the pressure plate and end parts fashioned inwardly toward the axis in overlapping relation with the pressure plate, a plurality of structurally separate flexible sheet metal drive members, each secured adjacent one edge to said end part of one bracket and each secured adjacent an opposite edge to the pressure plate for establishing a driving connection for the pressure plate and for permitting axial shift of the pressure plate, a plurality of substantially radially disposed levers each having its outer end fulcrumed on a bracket, its intermediate portion pivoted to the pressure plate and its inner end in proximity to the clutch axis, the structure including means for retracting the pressure plate against said inwardly fashioned parts of the brackets for holding the clutch disengaged, and non-rotatable means for exerting an axial force on the inner ends of the levers for shifting the pressure plate axially for clutch engagement.

4. A clutch comprising a driving member, a driven member, a pressure plate, a plurality of circumferentially spaced brackets secured to the driving member, a plurality of substantially radially disposed levers each fulcrumed on one of the brackets at its outer end, pivoted in its intermediate portion to the pressure plate, and having its inner end adjacent the axis of the driven member and arranged to receive axial pressure for clutch engagement, a plurality of structurally separate flexible sheet metal drive members, one for each bracket, means securing each flexible drive plate to a bracket so that the drive plate extends radially inwardly in overlapping relationship to a lever, means securing the inner portion of each flexible drive plate to the pressure plate, and a thrust bearing mounted adjacent the axis of the driven member for axial shift, for applying packing pressure to the inner ends of the levers for clutch engagement and to relieve the pressure for clutch release.

5. In a clutch, the combination of a rotary driving member, a driven member, a pressure plate, a plurality of groups of circumferentially spaced elements, each group comprising a bracket secured to the driving member, a flexible sheet metal plate disposed substantially in the plane of rotation, spaced from the driving member, connected at its outer portion to the bracket and at its inner portion to the pressure plate, and a lever of the second order having a fulcrum for its outer end supported by the bracket, a pivotal connection in its intermediate portion to the pressure plate and its inner end disposed in proximity to the clutch axis for the reception of clutch packing pressure, the lever of each group being located between the driving member and the flexible driving plate.

6. In a clutch, the combination of a rotary driving member, a driven member, a pressure plate, a plurality of groups of circumferentially spaced elements, each group comprising a bracket secured to the driving member, a flexible sheet metal plate disposed substantially in the plane of rotation, spaced from the driving member, connected at its outer portion to the bracket and at its inner portion to the pressure plate, and a lever of the second order having a fulcrum for its outer end supported by the bracket, a pivotal connection in its intermediate portion to the pressure plate and its inner end disposed in proximity to the clutch axis for the reception of clutch packing pressure, the lever of each group being located between the driving member and the flexible driving plate, means for retracting the pressure plate from the driving member, each bracket having a part for taking the retracting force and for limiting the retracting movement, and means for delivering axial thrust to the inner ends of the levers for shifting the pressure plate for clutch engagement.

7. A clutch comprising, a driving member, a driven member, a pressure plate, a plurality of levers, a pin for pivotally connecting each lever to the pressure plate, means fixed to the driving member and supporting a fulcrum for the outer end of each lever, packing spring means for transmitting axial forces to the inner end of each lever to pack the pressure plate, driving member and driven member into engaged relationship, means for establishing a drive connection between the driving member and pressure plate and for axial movement of the pressure plate, and relatively light torsion springs each having convolutions around one of said pins with oppositely projecting arms taking against the pressure plate and a member fixed to the drive member for normally holding the pressure plate retracted for clutch disengagement.

8. A pressure plate construction for a clutch wherein packing pressure is delivered to the pressure plate through circumferentially spaced clutch levers comprising, a ring-like body member for engaging a driven disc, a circumferentially extending reenforcing rib, a plurality of circumferentially spaced fillets joining the rib and ring-like body member, said pressure plate having substantially radially extending slots for the reception of the levers, and a reenforcing member bridging each slot and secured to the pressure plate on opposite sides thereof.

9. A pressure plate for a clutch wherein packing pressure is delivered thereto through clutch levers comprising, a ring-like body member having a friction face on one side, the opposite side of the ring-like body member having projecting rib-like reenforcing members for stiffening the ring-like body, said pressure plate having circumferentially spaced slots for the reception of clutch levers pivoted thereto, and a compression member bridging each slot on the side of the pressure plate opposite the friction face with the adjacent lever lying between the ring-like body and compression member, and means for securing each compression member to the pressure plate on opposite sides of each slot.

10. A clutch structure comprising in combination, a driving member, a driven member, a pressure plate, a plurality of circumferentially spaced formed sheet metal brackets secured to the driving member radially outwardly of the pressure plate and extending axially so as to overlap the peripheral portion of the pressure plate, a plurality of structurally separate flexible sheet metal drive members each secured adjacent one edge to one of the brackets and adjacent an opposite edge to the pressure plate for establishing a driving connection for the pressure plate and for permitting the pressure plate to shift axially away from the driving member for clutch disengagement, a plurality of substantially radially disposed levers each having its outer end fulcrumed on a bracket, its intermediate portion pivoted to the pressure plate, and its inner end in proximity to the clutch axis, and a thrust bearing mounted for axial shift and for engagement with the inner ends of the levers for delivering packing pressure to the inner ends of the levers for the shift of the pressure plate for clutch engagement.

ERNEST E. WEMP.